US009079786B2

(12) United States Patent
Van Leeuwen et al.

(10) Patent No.: US 9,079,786 B2
(45) Date of Patent: Jul. 14, 2015

(54) PURIFICATION OF THIN STILLAGE FROM DRY-GRIND CORN MILLING WITH FUNGI

(75) Inventors: Johannes Van Leeuwen, Ames, IA (US); Samir Kumar Khanal, Ames, IA (US); Anthony L. Pometto, Boone, IA (US)

(73) Assignee: Johannes Van Leeuwen, Ames, IA (US)

( * ) Notice: Subject to any disclaimer, the term of this patent is extended or adjusted under 35 U.S.C. 154(b) by 876 days.

(21) Appl. No.: 11/765,620

(22) Filed: Jun. 20, 2007

(65) Prior Publication Data

US 2008/0153149 A1    Jun. 26, 2008

Related U.S. Application Data

(60) Provisional application No. 60/805,263, filed on Jun. 20, 2006.

(51) Int. Cl.
| | |
|---|---|
| C02F 3/34 | (2006.01) |
| C02F 1/72 | (2006.01) |
| C02F 1/76 | (2006.01) |
| C02F 1/78 | (2006.01) |
| C02F 103/32 | (2006.01) |

(52) U.S. Cl.
CPC . *C02F 3/34* (2013.01); *C02F 1/722* (2013.01); *C02F 1/76* (2013.01); *C02F 1/78* (2013.01); *C02F 2103/32* (2013.01)

(58) Field of Classification Search
CPC ........... C02F 3/347; C12R 1/645; C12R 1/66; C12R 1/785; C12R 1/845
USPC .......................... 434/41, 171, 243, 254.1, 264
See application file for complete search history.

(56) References Cited

U.S. PATENT DOCUMENTS

| | | | |
|---|---|---|---|
| 2,556,084 A * | 6/1951 | Hildebrandt et al. ......... 435/165 |
| 3,899,376 A | 8/1975 | Azarowicz | |
| 3,979,283 A | 9/1976 | Prudom | |
| 4,056,636 A | 11/1977 | Muller | |
| 4,081,367 A | 3/1978 | Hulls | |
| 4,113,612 A | 9/1978 | Sekoulov | |
| 4,144,132 A | 3/1979 | Lines | |
| 4,243,685 A | 1/1981 | Simon | |
| 4,256,573 A | 3/1981 | Shimodaira | |
| 4,551,250 A | 11/1985 | Morper | |
| 4,622,982 A | 11/1986 | Gaisch | |
| 4,627,917 A | 12/1986 | Morper | |
| 4,800,021 A | 1/1989 | Desbos | |
| 4,816,158 A | 3/1989 | Shimura | |
| 5,075,088 A | 12/1991 | Lowe | |
| 5,296,138 A | 3/1994 | Walter | |
| 5,354,818 A | 10/1994 | Vazza | |
| 5,413,713 A | 5/1995 | Day | |
| 5,418,166 A | 5/1995 | Ehlinger | |
| 5,449,453 A | 9/1995 | Tang | |
| 5,525,228 A * | 6/1996 | Dague et al. .................. 210/603 |
| 5,567,314 A | 10/1996 | Chigusa | |
| 5,707,524 A | 1/1998 | Potter | |
| 5,776,344 A | 7/1998 | McCarty | |
| 5,811,289 A | 9/1998 | Lewandowski | |
| 5,879,928 A | 3/1999 | Dale | |
| 5,981,233 A | 11/1999 | Ringpfeil | |
| 6,036,854 A | 3/2000 | Potter | |
| 6,444,204 B1 | 9/2002 | Kuznetsov | |
| 6,664,100 B2 | 12/2003 | Reverso | |
| 7,160,714 B2 | 1/2007 | Matano | |
| 2006/0233864 A1 | 10/2006 | Power | |

FOREIGN PATENT DOCUMENTS

| | | |
|---|---|---|
| CN | 1151834 | 6/1997 |
| CN | 1297993 | 6/2001 |
| CN | 1297994 | 6/2001 |
| JP | 1-224012 | 9/1989 |
| JP | 7-274942 | 10/1995 |
| SU | 1175877 A | 8/1985 |

OTHER PUBLICATIONS

Coulibaly et al., "Utilization of fungi for biotreatment of raw wastewaters", African J. of Biotechnology, 2(12):620-630 (Dec. 2003).
Dhaouadi, Hatem et al., "Gas—liquid mass transfer in an airlift reactor—analytical solution and experimental confirmation", Chemical Engineering and Processing, 40:129-133 (2001).
Fu, Chun-Chong et al., "Performance of airlift bioreactors with net draft tube", Enzyme and Microbial Technology, 33:332-342 (2003).
da Nobega Gaiao, Edvaldo, et al., "Digital image-based titrations", Analytica Chimica Acta, 570:283-290 (2006).
Gavrilescu, M., et al., "Performance of airlift bioreactors in the cultivation of some antibiotic producing microorganisms", Acta Biotechnologica, 18(3):201-229 (2004). Abstract only.
Jin, Bo, et al., "A comprehensive pilot plant system for fungal biomass protein production and wastewater reclamation", Advances in Environmental Research, 6:179-189 (2002).
Jin, Bo, et al., "Production of fungal protein and glucoamylase by *Rhizopus oligosporus* from starch processing wastewater", Proc. Biochem, 34(1):59-65 (Jan. 1999).
Jin, Bo., et al., "Utilization of starch processing wastewater for production of MBP and fungal a-amylase by *Aspergillus oryzae*", Bioresource Techn., 66:201-206 (1998).
Jones, S.T., et al., "The influence of external airlift loop bioreactor configuration oin bioreactor hydrodynamics", American Society of Agricultural and Biological Engineers, Annual Meeting Presentation, Paper No. 077069, Jun. 17-20, 2007.
Merchuk, J.C., et al., "Airlift bioreactors: application to wastewater treatment", Dept. of Chemical Engineering, Ben-Gurion University of the Negev, Beer-Sheva, Israel and AqWise—Wise Water Technologies Ltd. P.O.B. 8698, Netanya 42504, Israel.
Rasmussen, Mary L., et al., "Bioconversion of thin stillage from corn dry-grind ethanol plants into high-value fungal biomass", American Society of Agricultural and Biologicay Engineers, Annual Meeting Presentation, Paper No. 077030, Jun. 17-20, 2007.

(Continued)

*Primary Examiner* — Ruth Davis
(74) *Attorney, Agent, or Firm* — Coleman & Horowitt, LLP; Sherrie M. Flynn

(57) ABSTRACT

The present invention is directed to an improved method of processing thin stillage from ethanol production and/or other industrial processes to produce high value fungal biomass that can be recovered by simple means. The effluent is sanitized and recycled using a novel disinfection technique. This innovative approach generates revenue from low value thin stillage, while reducing wastewater purification costs.

24 Claims, 2 Drawing Sheets

(56) References Cited

OTHER PUBLICATIONS

Ryan, Daniel R., et al., "Fungal bioremediation of phenolic wastewaters in an airlift reactor", Biotechnol. Prog. 21:1068-1074 (2005).
Varga, Eniko et al., "High solid simultaneous saccharification and fermentation of wet oxidized corn stover to ethanol", Biotechnology and Bioengineering, 88(5):567-574 (2004).
Yesilada, Ozer et al., "Treatment of olive oil mill wastewater with fungi", Tr. J. of Biology, 23:231-240 (1999).
"Reactor Model for Determining KLa", ct-cr4.chem.uva.nl/AirliftExpt/main.html (5 pages) printed Jan. 2, 2008.
"Oxygen mass transfer in an air-lift reactor", www.engin.umich.edu/class/che360/coursepack/ch14-bioreactor.pdf (14 pages).
Gate Information Service,Technical Information W4e, "Anaerobic Methods of Distillery Waste and Wastewater Treatment", Naturgerechte Technologien, Bau- und Wirtschaftsberatung (TBW) GmbH Frankfurt, Germany, Jun. 2000 (9 pages).
Leathers, Timothy, "Bioconversions of Agricultural Residues to Value-Added Coproducts Yeast-Like Fungi", Abstract printed from website, www.ars.usda.gov/research/publications/publications.htm?SEQ_NO_115=127355, May 3, 2006 (1 page).
Leathers, Timothy, "Bioconversions of maize residues to value-added coproducts using yeast-like fungi", PUBMED printout. Yeast Res. Apr. 2003; 3(2):133-40. (2 pages).
Riggles, David, "Acceptance Improves for Large-Scale Anaerobic Digestion", BioCycle Jun. 1998, pp. 51-55 (5 pages).
Lee, Jeewon, "Biological conversion of lignocellulosic biomass to ethanol", Journal of Biotechnology 56 (1997) pp. 1-24.
"Utilization of Agroindustrial By-Products and Crop Residues by Monogastric Species in Europe", Proceedings of the FAO/ILCA Expert Consultation Mar. 5-Sep. 1984,15 (Title correction of previously presented document).
Dhiraj, A et al., "Solid-state production of phenolic antioxidants from cranberry pomace by *Rhizopus oligosporus*", Food Biotechnol 2002, 16(3):189-210 (Title correction of previously presented document).
Jin, B et al., "Characterization and improvement of oxygen transfer in pilot plant external air-lift bioreactor for mycelial biomass production and wastewater treatment", World J Appl Microbiol Biotechnol 2001b, 17:265-72 (Title correction of previously presented document).
Rhodes, RA et al., "Lysine, methionine, and tryptophan content of microorganisms III. Molds.", Appl Environ Microbiol1961, 9(3): 181-84 (Title correction of previously presented document).
Tan, SC et al., "The chitosan yield of zygomycetes at their optimum harvesting time", Carbohydr Polym 1996,30(4):239-242 (Title correction of previously presented document).
"Utilization of Agroindustrial By-Products and Crop Residues by Monogastric Species in Europe", Proceedings of the FAO/ILCA EXQert Consultation Mar. 5-Sep. 1984, 15.
American Public Health Assoc., et al., "Standard methods for the examination of water and wastewater", 21 st ed. Washington DC, USA: APHA/AVWWA/WEF 2005.
Antai SP, Crawford DL., "Degradation of softwood, hardwood, and grass lignocelluloses by two Streptomyces strains", Appl Environ Microbiol 1981, 42: 378-80.
Association of Official, Analytical Chemists, "Official methods of analysis", 17th ed. Virginia, USA: AOAC International, 2005.
Cheeke, PR, "Applied animal nutrition: Feeds and feed", New Jersey. USA: Pearson Education, Inc. 2005.
Dhiraj, A et al., "Solid-state production of phenolic antioxidants from cranberry pomace by *Rhizopus oligosQ.orus*", Food Biotechnol 2002, 16(3):189-210.
Dubois, M. et al., "Colorimetric method for determination of sugars and related substances", Anal Chem 1956,28(3):350-56.
Gautam, P et al., "Microbial production of extracellular phytase using polystyrene as inert solid support", Bioresour Technol 2002, 83(3): 229-33.
Jasti, N et al., "Fungal treatment of corn processing wastewater in an attached growth system", Water Practice Technol 2006, 1 (3).
Jin, B et al., "A bioprocessing mode for fungal biomass protein production and wastewater treatment using an external airlift bioreactor", J Chem Technol Biotechnol2001,76:1041-48.
Jin, B et al., "Characterization and improvement of oxygen transfer in pilot plant external air-lift bioreactor for mycelial biomass production and wastewater treatment", World J Aool Microbiol Biotechnol2001b, 17:265-72.
Jin, B et al., "Mycelial morphology and fungal protein production from starch processing wastewater in submerged cultures of *Aspergillus oryzae*", Process Biochem 1999, 34(4):335-40.
Jin, B et al., "Screening and selection of microfungi for microbial biomass protein production and water reclamation from starch processing wastewater", J Chern Technol Biotechnol1999, 74:106-10.
Jin, B et al., "The influence of geometry on hydrodynamic and mass transfer characteristics in a new external airlift reactor for the cultivation of filamentous fungi", World J. Microbiol Biotechnol 1999, 15: 73-9.
Kunduru, MR et al., "Continuous ethanol production by *Zymomonas mobilis* and *Saccharomyces cerevisiae* in biofilm bioreactors", J. Ind Microbiol1996, 16: 249-56.
Nahas, E., "Control of lipase production by *Rhizopus oligosporus* under various growth conditions", J Gen Microbiol1998, 134(1): 227-33.
National Research Center (NRC), "Nutrient requirements of swine", 10th Ed. Washington, DC: National Academies Press 1998.
Nigam, P, "Process selection for protein-enrichment: fermentation of the sugar industry byproducts molasses and sugar beet pulp", Process Biochem 1994, 29(5): 337-42.
Rasmussen, M et al., "Thin stillage treatment from dry-grind ethanol plants with fungi", Minneapolis, MN, USA: American SOCiety of Agricultural and Biological Engineers IASABE) Annual International Meeting 2007.
Rhodes, RA et al., "Lysine, methionine, and tryptophan content of microorganisms III. Molds.", AQQI Environ Microbiol1961, 9(3): 181-84.
Singh, S. et al., "Ozone treatment of process water from a dry-mill ethanol plant", Bioresour Technol2007, 99(6): 1801-5.
Sparringa, RA, et al., "Causes of alkalinization in tempe solid substrate fermentation", Enzyme Microb Technol1999, 25: 677-81.
Sutardi, Buckle KA, "Characterization of extra-and intracellular phytases from *Rhizopus oligosporus* used in tempeh production", Int J Food Microbiol 1998,6:(1):67-79.
Tan, SC et al., "The chitosan yield of zygomycetes at their optimum harvesting time", Carbohvdr Polvm 1996,30(4):239-242.
Van Leeuwen, J (Hans) et al., "Kinetic model for selective cultivation of microfungi in a microscreen process for food processing wastewater treatment and biomass production", Acta Biotechnol 2003, 23(2-3): 289-300.
Walker, GM, "Yeast physiology and biotechnology", Chichester, UK: Wiley & Sons 1998.
Yanai, K et al., "Purification of two chitinases from *Rhizopus oligosporus* and isolation and sequencing of the encoding genes", J Bacteriol1992, 174(22): 7398-406.
Zhang, ZY et al., "Production of lactic acid from renewal materials by *Rhizopus* fungi", Biochem Ena J 2007,35: 251-63.
American Public Heal th Assoc., et al., "Standard methods for the examination of water and wastewater", 20 ed. Washington DC, USA: APHA/AWWA/WEF 1998.
Nahas, E., "Control of lipase production by *Rhizopus oligosporus* under various growth conditions", J Gen Microbiol1988, 134(1): 227-33.
Rhodes, RA et al., "Lysine, methionine, and tryptophan content of microorganisms III. Molds,", Appl Environ Microbiol1960, 9(3): 181-84.
Sutardi, Buckle KA, "Characterization of extra-and intracellular phytases from *Rhizopus oligosporus* used in tempeh production", Int J Food Microbiol 1988,6:(1):67-79.

\* cited by examiner

PURIFICATION OF THIN STILLAGE FROM DRY-GRIND CORN MILLING WITH FUNGI

CROSS-REFERENCE TO RELATED APPLICATIONS

This application claims priority under 35 U.S.C. §119 of a provisional application Ser. No. 60/805,263 filed Jun. 20, 2006, which application is hereby incorporated by reference in its entirety.

GRANT REFERENCE CLAUSE

This invention was made with government support under Grant No. 2006-34188-17123 awarded by USDA/CSREES. The government has certain rights in the invention.

BACKGROUND OF THE INVENTION

Iowa produces 25% of the nation's annual ethanol output of six billion gallons, making it the largest producer in the nation. The use of ethanol as fuel not only reduces the emission of harmful air pollutants, but also helps cut down dependence on imported fossil fuels. Dry-grind corn milling facilities are used mainly where corn is milled, cooked, and fermented in water. However, during fermentation in a corn dry milling facility, only about 30-35% of the corn is actually converted to ethanol, one-third to $CO_2$, and one-third remains as dissolved organics and solids in the whole stillage after distilling the ethanol. The stillage contains about 89% water.

Most of the solids in thin stillage are moved by centrifugation and dried to a product known as distillers dried grains (DDG), which is sold as animal feed. DDG are low in essential amino acids, particularly lysine (about 0.75%), limiting the use to ruminants mainly, while there is a much larger market in Iowa and other agricultural states for hog and chicken feed. The excess water from the centrifuge (centrate), known as thin stillage, contains about 6% organic material and is a major burden for ethanol plants.

An ethanol plant generates about 6 gallons of thin stillage per gallon of ethanol i.e. a typical 50 million gallon per year ethanol plant generates 300 million gallons of thin stillage, i.e. 550-600 gallon thin stillage/minute. Half of the thin stillage is typically recycled to the fermentation process, but the other half of it still has to be treated. Most of the water in thin stillage is evaporated to leave a syrup, which is blended with DDG in a product known as DDG with solubles (DDGS). Evaporation is costly and could add about $0.10 per gallon to the cost of producing ethanol. It generates air pollutants and a condensate rich in organic acids that requires additional treatment for removal before use as process water.

It is therefore a primary objective of the present invention to provide a means of reducing the thin stillage burden to ethanol plants.

It is a further objective of the present invention to provide a means of alleviating the need to treat thin stillage generated during ethanol production by evaporation and subsequent treatment to remove volatile organic compounds.

It is a further objective of the present invention to provide a means of reducing the energy requirements and costs associated with treating thin stillage during ethanol production.

It is a further objective of the present invention to provide a means of treating stillage that does not cause air pollution.

It is still a further objective of the present invention to provide a means of generating revenue from low-value thin stillage, while reducing wastewater purification costs.

The method and means of accomplishing each of the above objectives as well as others will become apparent from the detailed description of the invention which follows hereafter.

SUMMARY OF THE INVENTION

The present invention describes a novel method of converting the organic compounds in low-value thin stillage from dry-grind ethanol plants into high-value fungal biomass. The method involves first centrifuging stillage (thin stillage) left over from ethanol distillation to remove DDG. The centrifuged stillage is next treated in a fungal bioreactor, which results in the formation of treated water and fungal protein. The water formed can be subsequently disinfected or pasteurized to remove microorganisms if necessary. This treated water, in turn, may be recycled for use for a variety of purposes, including ethanol fermentation, fire extinguishing, and floor washing. Fungal spores or fungal mycelia are inoculated into the thin stillage in the fungal bioreactor at a pH ranging from about 3.0-6.0, and at a temperature ranging from about 20-50° C. Once produced, the harvested fungal biomass has a high nutrient content that makes it appropriate for use as an animal feed supplement. The fungi could be an important source of lysine or chitosan oligosaccharides, an important growth and immunity enhancer, depending upon the source of fungi employed.

DETAILED DESCRIPTION OF THE DRAWINGS

DETAILED DESCRIPTION OF THE PREFERRED EMBODIMENT

The present invention relates to the development of an improved method of treating wastewater streams produced during the manufacture of ethanol and as a result of other industrial processes. The method provides a low-energy alternative process using thin stillage as a substrate for cultivating molds to produce a high-value fungal biomass and reusable process water that may be recovered by simple means, while also reducing the energy needs for thin stillage evaporation.

As of 2007, ethanol production in Iowa is increasing at about 27% annually. As already noted, ethanol is produced mainly by dry-grind corn milling, co-producing considerable amounts of DDG and low-value thin stillage. Profitability in the ethanol industry is threatened by corn prices rising with increased demand, while DDG may flood the market. Thus, the industry needs to adapt. The present invention is aimed to add value to the by-products, extend marketability, reduce external enzyme needs and save energy by eliminating the need to evaporate water from thin stillage.

Figure 1:
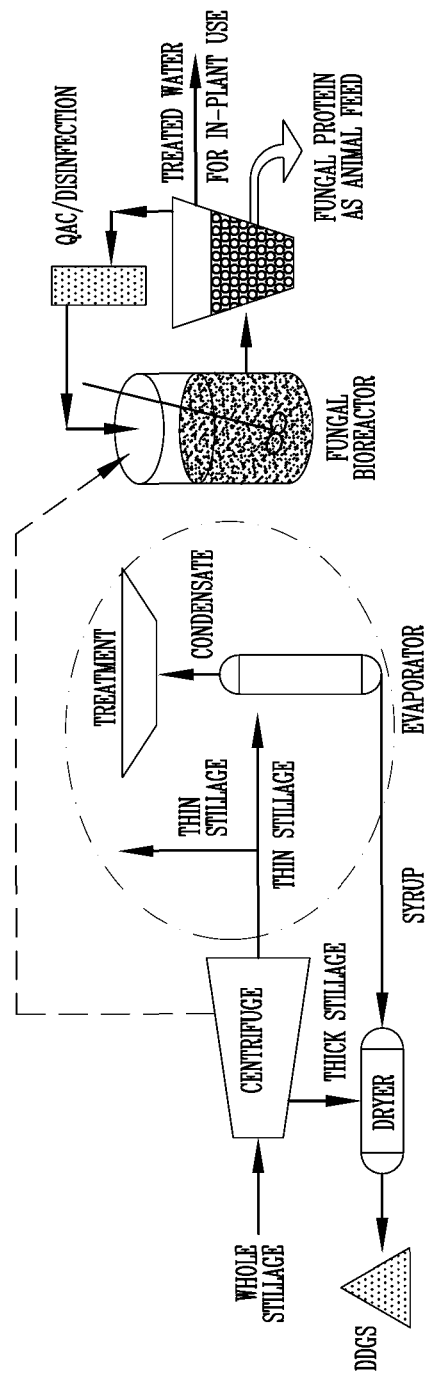
FIG. 1 illustrates a schematic showing potential integration of fungal process for thin stillage treatment and fungal protein recovery into an existing dry-grind ethanol mill.

Dry-grind ethanol mills treat their whole stillage using processing steps as presented in the left-hand box of FIG. 1. Part of the thin stillage is evaporated to leave a syrup, which is then blended with distillers dried grains (DDG). The process is energy intensive and, when the vapors are cooled, generates a condensate rich in organic acids that requires additional treatment before it can be used as process water.

The present invention eliminates the need for evaporation by removing the dissolved organic material through a fungal cultivation process. In this regard, the thin stillage stream is directed to a fungal reactor (right-hand box of FIG. 1) to produce valuable fungal protein. The water that is separated may be reused in corn fermentation (or for other various purposes) following disinfection.

The method of the invention first involves obtaining an industrial wastewater stream (whole stillage), and separating the solids (thick stillage) from the liquid (thin stillage). While the described invention speaks primarily in terms of treating wastewater obtained from ethanol treatment plants, it may also be applied to wastewater produced from other industrial processes, such as food industry, petrochemical industry, wet corn milling, and effluents from acidogenic anaerobic fermentation. The only requirements of the wastewater used in the invention are that the chemical composition be known and relatively consistent, the wastewater not contain pathogenic microorganisms, and that the wastewater contain high concentrations of biodegradable organic compounds. The waste organic matter is used as a substrate for growth of biomass that can be sold in the U.S. market. There is a growing demand all over the world for protein, which can be used as an animal feed supplement or in pet food.

Analysis of thin stillage by the inventors showed that it is rich in carbohydrates, lipids, protein and micronutrients (Table 1). It is generally free from pathogens and toxicants, and rich in organic compounds, which makes it an ideal and inexpensive substrate for cultivating valuable fungi with concomitant remediation of process waste streams. It has a total chemical oxygen demand (COD) of about 100 g/L and has a pH of about 4.0.

TABLE 1

Characteristics of total and thin stillage

| Parameters | Values | Parameters | Values |
|---|---|---|---|
| % TS* | 6.1 | pH | 4.46 |
| % VS | 5.3 | VFA, mg/L | 1,310 |
| VS/TS ratio | 0.87 | Alkalinity, mg/L as $CaCO_3$ | 0 |
| % TSS | 2.1 | Carbohydrate, mg/L as glucose** | 13,600 |
| % VSS | 2.1 | TKN, mg/L as N | 1,720 |
| TCOD, g/L | 94 | $NH_3$—N, mg/L** | 32.1 |
| SCOD, g/L | 49 | TP, mg/L as P | 1,292 |

1% = 10,000 mg/L;
**Tested on soluble portion of the sample

In comparison, DDG are low in essential amino acids, particularly lysine (about 0.75%), limiting use primarily to feed ruminants, while many of the agricultural areas have a much larger market for hog and chicken feed. Lysine is extremely important for rapid animal growth. Microfungi contain typically about 7% lysine (better than soybeans) and around 40% protein. The fungi could be added to DDG to extend use in swine and poultry rations and to enrich ruminant diets.

The fungal biomass is also an ideal source of the nutraceuticals chitin/chitosan, constituting 5-9% of the biomass, traditionally obtained from crustaceans at a cost of about $8,000 per ton. In addition, fungal-derived chitosan oligosaccharides (COS) have several health benefits to swine and possibly poultry as a prebiotic and immunity enhancer. Chitin and its derivatives: chitosan, and chitin and chitosan oligosaccharides have unique characteristics, potentially improving animal health and eliminating the use of antibiotics in feed. The major source of chitin-derived chitosan oligosaccharide (COS) has been crustacean exoskeletons. The supply from such sources, particularly in the United States, is limited due to logistics of collection. The fungal production on thin stillage provides a new opportunity to produce such a compound right in the heart of biofuel and livestock production facilities.

The energy savings from eliminating thin stillage evaporation could save $60 million/year just in the State of Iowa. Excess enzymes recycled with fungal-treated water from thin stillage could also add value of millions of dollars per year. The potential revenue from value-added animal feed production along with expanding the market value of DDG by improving the nutritional value through adding fungal biomass is expected to be worth even more.

The present invention is based on the ability of fungal cultures to degrade organic compounds present in wastewater. Tests performed with wastewater treated in accordance with the invention, show that fungi may be successfully grown in thin stillage with a COD of around 100,000 mg/L having a total solids content of around 6%. The test results further demonstrated that the methods of the invention were successful in achieving an organic removal efficiency of over 20-99%, and typically at least 60%, with a fungal yield of about 0.40 g/g $COD_{removed}$.

In order to produce marketable fungal biomass in accordance with the invention, the selected culture must have the ability to utilize the waste organic matter. The microorganism should also be safe (i.e. not cause health problems to the animal if ingested), able to degrade organic matter from wastewater, have high protein content (at least 40% by weight), and be easily and reliably maintained in the reactor.

In one embodiment of the invention, the fungal culture is a mold of the phylum Zygomycota, including the geni *Aspergillus*, *Rhizopus*, *Mucor*, *Geotrichum* and others. The preferred family of fungi for use in the invention is Mucoraceae due to the nutritional content of the genuses *Rhizopus* and *Mucor*. In this regard, the *Rhizopus* fungi have a high lysine content (up to 7%), while *Mucor* fungi have a high content of chitosan. In most preferred embodiments of the invention, the fungi are *Mucor indicus* (*rouxii*), *Rhizopus microsporus* (*oligosporus*) and/or mixtures thereof. Such fungal cultures are well known in the art, and are readily obtainable via conventional supplies, such as from the American Type Culture Collection and various other sources known in the art. Prior to incorporation into the wastewater, the fungi are "revived" by conventional means using a nutrient broth containing a carbon source, such as dextrose or glucose. In this regard, potato dextrose broth is a preferred carbon source.

The process first involves combining molds/microfungi with wastewater or sludge issuing from an industrial plant. The fungi and wastewater may be combined in a continuous flow bioreactor or other appropriate reaction vessel. In one embodiment, *Rhizopus* or other appropriate microfungi (molds, filamentous fungi) spores or mycelia are introduced in thin stillage in a 1 L aerated stirred tank reactor with pH, dissolved oxygen and temperature control. Thin stillage contains large numbers of micro-particles (corn residues and yeast cells primarily) of 5-100 μm size. The strong affinity of microfungi to attach to solids causes the particles to act as nuclei for molds to attach and form settleable or easily screenable pellets. These pellets continue to grow to a size of 3-5 mm by consuming dissolved organics from the aqueous phase. Thus, the particulate and dissolved organic pollutants are removed from the liquid phase. Thick growths of molds develop rapidly and may be easily separated by settling and/or filtration.

The process of the invention is effective in treating low, medium, and high strength wastewater having a COD up to at least 60,000 mg/L, and possibly greater than 100,000 mg/L. It is not necessary to combine the wastewater entering the vessel with additional liquid to decrease the amount of total solids.

However, the wastewater may be diluted prior to treatment if desired. As noted above, prior to treatment, the wastewater will typically have a biomass solids concentration of about 6 g/L. The feed rate of the wastewater may vary, and depends primarily upon the flow rate from the wastewater source. The recirculation rate in the bioreactor should preferably be maintained at 300 to 400% of the influent flow rate to minimize the bacterial growth in the bioreactor. The bioreactor is preferably operated with an air supply rate of greater than 0.2 $L/L_{reactor}$-min, with a preferred air supply rate of about 2 $L/L_{reactor}$-min.

The processing temperature of the wastewater may generally range from 20-50° C. In one embodiment, the processing temperature is between about 30-40° C., with about 37° C. being most preferred. Above ambient temperatures are preferred for purposes of cost and convenience as the stillage is already hot after distillation to remove the ethanol.

As a general guideline, the fungi should be inoculated into the wastewater at about 1-2% fungi to wastewater (0.25% mass), and under conditions favorable to growth of the fungi. In this regard, the pH of the fungi/wastewater mixture is preferably about 3.0-6.0, with about 4.0 being preferred. In one embodiment of the invention, the pH is maintained above 4.0. Means for pH control are known in the art and include addition of various industrial acids or bases to the mixture, such as acetic acid, citric acid, propionic acid, butyric acid, sulfuric acid, phosphoric acid, lime, and soda. Such pH-controlling agents must be compatible with the other ingredients. In one embodiment, the pH controlling agent is a mineral acid or base.

In addition, the system should be operated at a hydraulic retention time (HRT) of between about 12-96 hours, and a solid retention time (SRT) of between about 6-48 hours. In one embodiment, a shorter fungal retention time (SRT) than HRT is employed to ensure that the biomass concentration is kept low enough for rapid fungal growth, easy settling/ screening and well clarified effluent. While the system may be operated at SRTs of more than 2 days, as a practical matter, SRTs of greater than 2 days result in impracticably high fungal biomass concentrations, which increase the treatment costs without a significant improvement in the effluent quality. It may also be preferred to use a longer HRT for medium to high strength wastewater. The HRT will be determined by the time required to satisfy the oxygen demand and this relates to reactor design to increase the rate of oxygen transfer.

The fungal biomass, along with corn solids, may be easily separated from the water by micro-screening, settling, or dissolved air flotation. The microfungi assimilate the organic compounds in the wastewater to produce a high quality proteinaceous fungal biomass. This high protein biomass may in turn be incorporated into animal feed supplements and pet food, or blended with DDG to improve flavor and feed nutrient value.

The water separated from the fungal biomass may be disinfected and subsequently used as well. In this regard, the water may be disinfected through the use of disinfectants known in the art including, but not limited to, hydrogen peroxide, ozone, chlorine, an immobilized quaternary ammonium compound (QAC), and/or combinations thereof. In a preferred method of the invention, the water is disinfected by passing it through sand coated with silane-bonded QAC to eliminate unwanted opportunistic bacteria. In an alternative method of the invention, the treated water is heat pasteurized to remove unwanted opportunistic bacteria. In another alternative, a disinfectant is dosed, by preference ozone, which leaves no lasting residual. Once disinfected, the water may be recycled for various purposes, such as ethanol fermentation, fire extinguishing, and floor washing. Disinfection is not be required if the water is recycled to a fermentation process involving cooking of the corn mash.

Each dry-grind mill expends millions of dollars per year on enzymes. *Rhizopus* sp. are also known to produce α-amylase (Jin et al. 1998) and possibly others. The value of enzymes depends on the excess production level available for recycling and could also amount to savings of millions of dollars per year. Recycling enzymes with the recovered water is expected to lead to substantial savings.

Based upon preliminary test results, an organic removal efficiency of over 60% was achieved using the methods described above. The fungi grew to a density of around 15 g/L and the opaque yellowish color of the thin stillage disappeared within a day, resulting in a clear effluent. As much as 80,000 mg/L of the COD was removed during fungal fermentation by *Rhizopus* spp., thereby forming fungal pellets mycelia growing in flocs or pellets that are easily separated by micro-screening.

The following examples are offered to illustrate but not limit the invention. Thus, they are presented with the understanding that various formulation modifications as well as reactor modifications may be made and still be within the spirit of the invention.

EXAMPLE 1

Fungal Treatment of Thin Stillage

Proposed Research and Deliverables

Task 1 Development of fungal bioreactor: *Rhizopus* sp. will be cultivated continuously in a suspended growth bioreactor using thin stillage as substrate. Oxygen demand is the main limiting factor and means of speeding up air supply, such as an airlift reactor will be developed.

Task 2 Optimization of fungal bioreactor operation: The fungal bioreactor will be operated at retention times of 24-96 hours and different rates of air supply. The operating pH and temperature of the bioreactor will be maintained at 4.0 and 38° C., respectively, already found optimal for fungal growth. Fortuitously, thin stillage is produced at a pH 4.0-4.5 and a temperature of 50-60° C. The combinations of parameters with maximum organic removal and fungal yield will be chosen. Harvesting will be developed.

Task 3 Water disinfection: Effluent from the fungal reactor may need removal of competitive bacteria. Immobilized QAC will be examined for its effectiveness in microbial disinfection. The supernatant from the clarifier will be passed through a QAC column. As an alternative, ozonation or the use of other innocuous disinfectants will be developed.

Task 4 Analysis of fungal biomass for its suitability as an animal feed supplement: The fungal biomass will be analyzed for its nutrient value. The analyses include moisture content, total nitrogen, non-protein nitrogen, ash, total lipid, neutral detergent fiber, acid detergent fiber, acid detergent fiber nitrogen, amino acids and micronutrients.

Task 5 Development of design guidelines for pilot/full-scale plants: The data obtained from Tasks 1 through 4 will be examined to obtain design parameters for pilot and full-scale plants. The design parameters include hydraulic retention time, fungal concentration and retention time, organic loading rate, recirculation rate, disinfection needs and breakthrough time.

Task 6 Economic analysis: The conversion fraction and production rates possible for the fungal byproduct will be determined and used to calculate the predicted income based on the value of this product as a high-quality animal feed. The fungal treatment requirements will be used as a basis for estimating both the capital and operational requirements and treatment costs. This will be compared to the current treatment costs. The setup costs of plants on various scales and annualized rates of return will be used to identify break-even and optimal possibilities for retrofitting of the proposed process and for implementing in new ethanol plants.

Project Deliverables: The proposed research and technology development project will add a new dimension to the existing and new ethanol plants in Iowa and the nation by generating additional revenue from low/negative value coproducts, and indeed a new co-product of high quality. The hotly debated ratio of energy input to energy produced will be improved greatly.

EXAMPLE 2

Fungal Treatment of Thin Stillage

Figure 2:
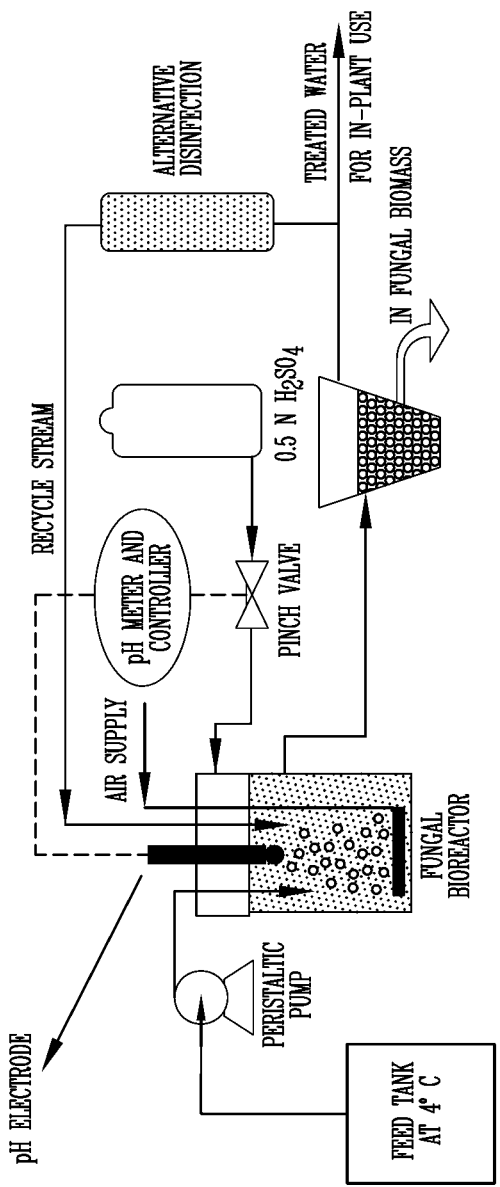
FIG. 2 illustrates a schematic of a fungal bioreactor adapted for thin stillage fermentation.

Task 1 Fungal bioreactor start-up and operation: Two species of micro-fungi, namely *Rhizopus oligosporus* (Jin et al., 1999a; 1999b) and *Mucor indicus*, will be selected for this study because of their ability to degrade high strength organic wastewater, to produce a high fungal biomass yield and the desirable biochemical chitosan respectively. Two airlift fungal bioreactors of 17 L working volume are being built. The first will be seeded aseptically with 2, 2-ml cryo-vials of pure mold culture of *Mucor* sp., whereas the other one will be seeded with two, 2-ml cryo-vials of *Rhizopus* sp. These species will be obtained from commercial stock culture collections and will be cultivated continuously initially using potato dextrose broth, which is a favorable growth medium for these molds. A schematic of the reactor set-up is shown in FIG. 2. The thin stillage will be stored at 4° C. and pumped to the bioreactor to maintain a hydraulic retention time (HRT) of 1 to 3 days. The operating pH and temperature of the bioreactor will be maintained at pH 4.0 and 38° C., respectively, which have been found optimal for *Rhizopus* growth based on our other studies (Jasti et al., 2005). Fortuitously, the thin stillage exits from the plant at a pH of 4.0-4.5 and a temperature of 50-60° C., and makes it an ideal feedstock for fungal growth.

Task 2 Optimization of fungal bioreactor operation: The fungal bioreactor will be operated at three different HRTs of 24, 48 and 72 hours. Such long HRTs are expected to be necessary because of limitations on the rate of aeration. Air supply rates will be maximized above $1.0.L/L_{reactor}$-min. The biomass solids retention time (SRT) will be maintained at 8-24 h to maintain fungal biomass levels that will be settleable.

Task 3 Evaluation of selective disinfection for removal of bacteria: Continuous addition of hydrogen peroxide or ozone directly into the fungal reactor will be studied in the first instance. An alternative measure, silane bonded quaternary-ammonium compounds (QAC) will also be studied. The supernatant from the settling basin will be passed through a column filled with granular material with immobilized QAC. The recirculation rate will be maintained at 300 to 400% of the influent flow rate to minimize the bacterial growth in the bioreactor. The effectiveness of QAC in disinfection will be examined by quantifying bacterial cell counts in the output water using fluorescent staining flow cytometry analysis using the BacLight bacterial detections system in which live bacteria fluoresce green and dead bacteria fluoresce red.

Task 4 Analysis of fungal biomass for its suitability as an animal feed supplement: The harvested fungal biomass will be analyzed for its nutrient value. The analyses include moisture content, total nitrogen, non-protein nitrogen, ash, total lipids, neutral detergent fiber, acid detergent fiber, acid detergent fiber nitrogen, amino acids and micronutrients (e.g. calcium, phosphorus, sulfur, iron, potassium, magnesium, chloride etc.).

Task 5 Conduct pilot-scale testing: The bench-scale results from Tasks 1 through 3 will provide data and process performance information (e.g. HRT, fungal concentration, solids retention time, organic loading rate, recirculation rate (or residence time in bactericidal reactor), minimum levels of quaternary-amine attached to solid surfaces and breakthrough time) to obtain design parameters to develop a pilot plant.

Task 6 Economic analysis: Economic analyses will be conducted after both bench-scale and pilot studies. The benefits from recovered value-added products (e.g. protein biomass and chitosan) and waste remediation and the power savings in not having to evaporate the thin stillage will be weighed against the expected capital and operational costs of a fungal process and the loss of not having the regular solids as part of the DDGS. Finally, the economic benefits of reducing waste disposal and much of the air pollution of ethanol production, this will be apportioned.

Persons skilled in the art will readily appreciate that the processes described above may in some instances be combined or separated into several steps. Furthermore, persons skilled in the art will also readily appreciate that the processes of this invention may be accomplished using a variety of equipment and techniques that are well known in the art. The specific equipment and processes used are not crucial so long as the intended result is accomplished.

It should be appreciated that minor modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of treating a wastewater stream comprising:
    treating the wastewater stream in a fungal bioreactor, said fungal bioreactor being seeded with fungi of the phylum Zygomycota;
    said fungi forming a fungal biomass;
    separating reusable wastewater and said fungal biomass based on physical properties to recover both useful biomass and water; and
    wherein said fungal bioreactor is operated with a solid retention time (SRT) that is shorter than the hydraulic retention time (HRT).

2. The method of claim 1 whereby the fungi are selected from the group consisting of *Aspergillus, Rhizopus, Mucor, Geotrichum*, and mixtures of the same.

3. The method of claim 2 whereby the fungi are selected from the group consisting of *Rhizopus, Mucor*, and mixtures of the same.

4. The method of claim 3 whereby the fungi are selected from the group consisting of *Mucor indicus, Rhizopus microsporus*, variant *oligosporus*, and mixtures of the same.

5. The method of claim 3 further including the step of using the fungal biomass in the manufacture of animal feed, said fungal biomass comprising a nutrient selected from the group consisting of lysine, chitosan, and mixtures of the same.

6. The method of claim 5 whereby the fungal bioreactor is operated at a pH of above 4.0.

7. The method of claim 1 whereby the wastewater stream is stillage left over from distillation of ethanol.

8. The method of claim 7 whereby the stillage is centrifuged to form thin stillage and thick stillage, and further providing that the thin stillage is treated in the fungal bioreactor.

9. The method of claim 1 whereby the wastewater is treated to form treated water and fungal biomass.

10. The method of claim 9 further including the step of disinfecting the treated water to remove unwanted opportunistic bacteria.

11. The method of claim 10 whereby the treated water is disinfected through use of an agent selected from the group consisting of hydrogen peroxide, ozone, chlorine, an immobilized quaternary ammonium compound, and combinations of the same.

12. The method of claim 9 further including the step of heat pasteurizing, cooking or autoclaving the treated water to remove unwanted opportunistic bacteria.

13. The method of claim 9 further including the step of recycling the treated water for use for a purpose selected from the group consisting of ethanol fermentation, fire extinguishing, and floor washing.

14. The method of claim 9 further including the step of using the fungal biomass in the manufacture of animal feed.

15. The method of claim 1 whereby the fungal bioreactor is operated in a pH range of from about 3.0-6.0.

16. The method of claim 1 whereby the fungal bioreactor is operated at a temperature ranging from about 20-50° C.

17. The method of claim 1 whereby the fungal bioreactor is operated at a temperature of about 37° C.

18. The method of claim 1 whereby the fungal bioreactor is operated at a hydraulic retention time (HRT) of between about 6-96 hours.

19. The method of claim 1 whereby the fungal bioreactor is operated with a solid retention time (SRT) of between about 12-48 hours.

20. The method of claim 1 whereby the fungal bioreactor is operated with an air supply rate of above 0.2 L/Lreactor/min (liter of air per liter of reactor per minute).

21. The method of claim 1 which results in 20-99% removal of chemical oxygen demand.

22. The method of claim 1 which results in fungal yield of about 0.40 g/g (gram per gram) chemical oxygen demand removed.

23. A method of treating a wastewater stream comprising:
   treating the wastewater stream in a fungal bioreactor, said fungal bioreactor being seeded with fungi of the phylum Zygomycota;
   said fungi forming a fungal biomass;
   separating reusable wastewater and said fungal biomass; and
   whereby said fungal bioreactor is operated with a solid retention time (SRT) that is shorter than the hydraulic retention time (HRT).

24. A method of treating a wastewater stream comprising:
   said wastewater stream generally free from pathogens and toxicants;
   treating the wastewater stream in a fungal bioreactor, said fungal bioreactor being seeded with fungi of the phylum Zygomycota,
   said fungi forming a fungal biomass;
   whereby said fungal bioreactor is operated with a solid retention time (SRT) that is shorter than the hydraulic retention time (HRT);
   separating said fungal biomass and resulting treated wastewater.

* * * * *